United States Patent
Fan et al.

(10) Patent No.: US 12,236,712 B2
(45) Date of Patent: Feb. 25, 2025

(54) FACIAL EXPRESSION RECOGNITION METHOD AND APPARATUS, ELECTRONIC DEVICE AND STORAGE MEDIUM

(71) Applicant: Tencent Technology (Shenzhen) Company Limited, Guangdong (CN)

(72) Inventors: Yanbo Fan, Guangdong (CN); Yong Zhang, Guangdong (CN); Le Li, Guangdong (CN); Baoyuan Wu, Guangdong (CN); Zhifeng Li, Guangdong (CN); Wei Liu, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 477 days.

(21) Appl. No.: 17/473,887

(22) Filed: Sep. 13, 2021

(65) Prior Publication Data
US 2021/0406525 A1  Dec. 30, 2021

Related U.S. Application Data

(63) Continuation of application No. PCT/CN2020/092593, filed on May 27, 2020.

(30) Foreign Application Priority Data

Jun. 3, 2019  (CN) .......................... 201910478195.3

(51) Int. Cl.
*G06V 40/16*  (2022.01)
*G06F 18/21*  (2023.01)
(Continued)

(52) U.S. Cl.
CPC .......... *G06V 40/174* (2022.01); *G06F 18/214* (2023.01); *G06F 18/2193* (2023.01);
(Continued)

(58) Field of Classification Search
CPC .... G06V 40/174; G06V 10/255; G06V 10/44; G06V 10/56; G06V 40/171;
(Continued)

(56) References Cited

U.S. PATENT DOCUMENTS

2008/0260212 A1\* 10/2008 Moskal .............. G06V 40/1371
   382/209
2017/0116467 A1   4/2017 Li et al.
(Continued)

FOREIGN PATENT DOCUMENTS

CN       101620669 A      1/2010
CN       106256469 A      7/2016
(Continued)

OTHER PUBLICATIONS

Chinese Office Action issued Nov. 16, 2020 in Chinese Application No. 201910478195.3, with English translation, 19 pgs.
(Continued)

*Primary Examiner* — Ping Y Hsieh
*Assistant Examiner* — Vaisali Rao Koppolu
(74) *Attorney, Agent, or Firm* — ArentFox Schiff LLP

(57) ABSTRACT

A facial expression recognition method includes extracting a first feature from color information of pixels in a first image, and extracting a second feature of facial key points from the first image. The method further includes combining the first feature and the second feature, to obtain a fused feature, and determining, by processing circuitry of an electronic device, a first expression.

20 Claims, 7 Drawing Sheets

(51) Int. Cl.
  *G06F 18/214* (2023.01)
  *G06F 18/25* (2023.01)
  *G06N 3/045* (2023.01)
  *G06V 10/20* (2022.01)
  *G06V 10/44* (2022.01)
  *G06V 10/56* (2022.01)
(52) U.S. Cl.
  CPC .......... *G06F 18/253* (2023.01); *G06N 3/045* (2023.01); *G06V 10/255* (2022.01); *G06V 10/44* (2022.01); *G06V 10/56* (2022.01); *G06V 40/171* (2022.01)
(58) Field of Classification Search
  CPC .. G06V 10/806; G06V 40/168; G06F 18/214; G06F 18/2193; G06F 18/253; G06N 3/045; G06N 3/084
  See application file for complete search history.

(56) References Cited

U.S. PATENT DOCUMENTS

| | | | | |
|---|---|---|---|---|
| 2017/0262472 | A1* | 9/2017 | Goldenberg | G06V 40/16 |
| 2018/0144185 | A1* | 5/2018 | Yoo | G06V 40/175 |
| 2018/0211102 | A1* | 7/2018 | Alsmadi | G06V 40/171 |

FOREIGN PATENT DOCUMENTS

| | | | | | |
|---|---|---|---|---|---|
| CN | 103824059 | B | * | 2/2017 | |
| CN | 107169413 | A | | 9/2017 | |
| CN | 107358169 | A | | 11/2017 | |
| CN | 107657204 | A | | 2/2018 | |
| CN | 108038456 | A | * | 5/2018 | ............. G06N 3/045 |
| CN | 108090460 | A | | 5/2018 | |
| CN | 108256469 | A | * | 7/2018 | ......... G06K 9/00281 |
| CN | 109117795 | A | * | 1/2019 | ......... G06K 9/00268 |
| CN | 109446980 | A | | 3/2019 | |
| CN | 109684911 | A | | 4/2019 | |
| CN | 109711378 | A | | 5/2019 | |
| CN | 109786840 | A | | 5/2019 | |
| CN | 109815924 | A | * | 5/2019 | |
| CN | 110245573 | A | * | 9/2019 | ......... G06K 9/00228 |
| CN | 110263681 | A | | 9/2019 | |
| CN | 108268838 | B | * | 12/2020 | ......... G06K 9/00281 |
| WO | WO 2017/045157 | A1 | | 3/2017 | |

OTHER PUBLICATIONS

Chinese Office Action issued Feb. 22, 2021 in Chinese Application No. 201910478195.3, with English translation, 15 pgs.

International Search Report Issued Sep. 3, 2020 in International No. PCT/CN2020/092593, with English translation, 11 pgs.

Zhang et al., Facial Landmark Detection by Deep Multi-task Learning, ECCV 2014, Part VI, LNCS 8694, Dept. of Information Engineering, The Chinese University of Hong Kong, Hong Kong, China pp. 94-108, 2014, (18 pgs).

Yon et al., Spatial Temporal Graph Convolutional Networks for Skeleton-Based Action Recognition, The Thirty-Second AAAI Conference on Artificial Intelligence (AAAI-18), Association for the Advancement of Artificial Intelligence (www.aaai.org, 9 pgs.

Zhang, et al., Multimodal learning for facial expression recognition, Pattern Recognition 48 (2015 )3191-3202.2015 Elsevier Ltd. journalhomepage: www.elsevier.com/locate/pr http://dk.doi.org/10.1016/j.pateog.2015.04.012, (12 pgs).

Jung, et al., Joint Fine-Tuning in Deep Neural Network for Facial Expression Recognition, CVF, This ICCV paper is the Open Access version, provided by the Computer Vision Foundation, Except for this watermark, it is identical to the version available on IEEE Xplore, School of Electrical Engineering Korea Advanced Institute of Science and Technology (9 pgs).

He. et al. Deep Residual Learning for Image Recognition, CVF, This ICCV paper is the Open Access version, provided by the Computer Vision Foundation. Except for this watermark, it is identical to the version available on IEEE Xplore. (9 pgs).

Khan, Facial Expression Recognition using Facial Landmark Detection and Feature Extraction via Neural Networks, arXIV-1812.04510v3 [cs.CV] Jul. 15, 2020.

Zhang, et al., Facial Expression Recognition Based on Deep Evolutional Spatial-Temporal Networks, IEEE Transactions on Image Processing, vol. 26, No. 9, Sep. 2017, (11 pgs).

Day, Exploiting Facial Landmarks for Emotion Recognition in the Wild, Department of Electronics, University of York, UK, This paper was originally accepted to the ACM International Conference on Multimodal Interaction (ICMI 2015), Seattle, USA, Nov. 2016. It has been made available through arXiv.org because the author was unable to present., (4 pgs).

Li et al., Deep Facial Expression Recognition: A Survey, arXiv:1804.08848v2 [ cs.CV] Oct. 22, 2018, The authors are with the Pattern Recognition and Intelligent System Laboratory, School of Information and Communication Engineering, Beijing University of Posts and Telecommunications, Beijing, 100876 China, (25 pgs).

Mollahosseini, et al. , AffectNet: A Database for Facial Expression, Valence, and Arousal Computing in the Wild, IEEE Transactions on Affective Computing, airXiv:1708.03985v4 [cs.CV], Oct. 9, 2017, Authors are with the Department of Electrical and Computer Engineering, University of Denver, Denver, CO, 80210, (18 pgs).

* cited by examiner

Extract a first feature from color information of pixels in the first image, extract a second feature of facial key points from the first image, fuse the first feature and the second feature to obtain a fused feature, and determine a first expression type of the face of the object in the first image according to the fused feature — S204

Extract, in a convolutional neural network, the first feature used for representing the texture in the first image based on the color information of the pixels in the first image, and extract, in a graph neural network, the second feature used for representing correlations between the facial key points — S2042

A classification network, which has learned correspondences between different first and second features and different expression types through pre-training, identifies, from a plurality of expression types, the first expression type corresponding to the first feature and the second feature — S2044

FIG. 2C

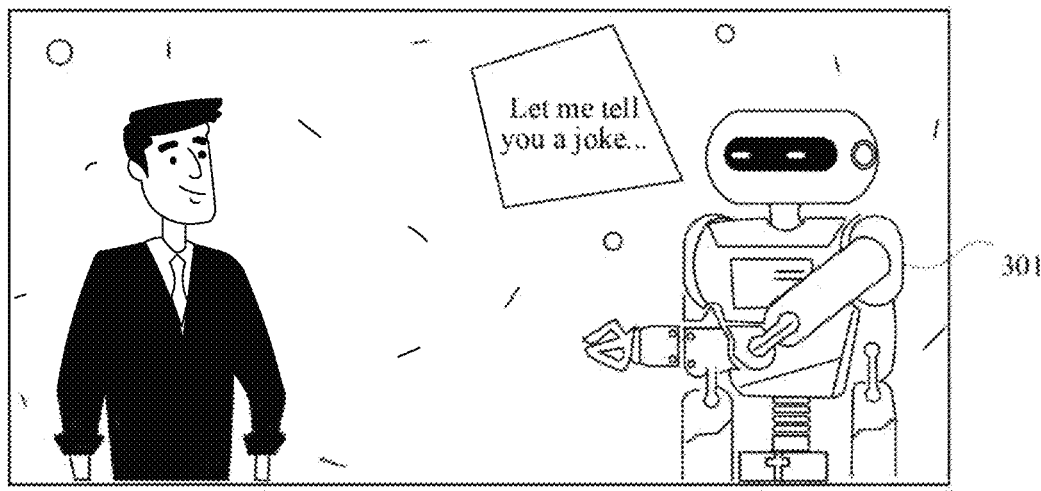

FIG. 3

FACIAL EXPRESSION RECOGNITION METHOD AND APPARATUS, ELECTRONIC DEVICE AND STORAGE MEDIUM

RELATED APPLICATIONS

This application is a continuation of International Application No. PCT/CN2020/092593, filed on May 27, 2020, which claims priority to Chinese Patent Application No. 201910478195.3 filed on Jun. 3, 2019. The entire disclosures of the prior applications are hereby incorporated by reference in their entirety.

FIELD OF THE TECHNOLOGY

This application relates to the field of artificial intelligence (AI), including a facial expression recognition method and apparatus, an electronic device, and a computer-readable storage medium.

BACKGROUND OF THE DISCLOSURE

At is a comprehensive technology of computer science, which, through studying design principles and implementation manners of various intelligent machines, allows these machines to have functions of perception, reasoning, and decision-making. AI technology is a comprehensive discipline, covering a wide range of fields, such as natural language processing, machine learning/deep learning, and the like. As technology advances, AI technology will be applied in more fields and will play an increasingly important role.

The production of human emotions is a very complex psychological process. Additionally, emotions can be expressed through different ways. There are three main ways that are often studied by computer scientists: expressions, voices, and actions. Among the three ways of expressing emotions, the proportion of emotions expressed through expressions is as high as 55%. With the increasing application of human-computer interaction technology, facial expression recognition technology is of great significance in the fields of human-computer interaction, autonomous driving, medical health, and the like.

By applying AI technology to facial expression recognition, facial expressions can be recognized. However, the accuracy of the facial expression recognition is relatively low using related methods.

SUMMARY

Embodiments of this application provide a facial expression recognition method and apparatus, an electronic device, and a computer-readable storage medium, which can improve the accuracy of recognizing facial expression types.

In an embodiment, a facial expression recognition method includes extracting a first feature from color information of pixels in a first image, and extracting a second feature of facial key points from the first image. The method further includes combining the first feature and the second feature, to obtain a fused feature, and determining, by processing circuitry of an electronic device, a first expression type of a face in the first image according to the fused feature.

In an embodiment, a facial expression recognition apparatus includes processing circuitry configured to extract a first feature from color information of pixels in a first image. The processing circuitry is further configured to extract a second feature of facial key points from the first image, combine the first feature and the second feature, to obtain a fused feature; and determine a first expression type of a face in the first image according to the fused feature.

In a non-limiting embodiment, a non-transitory computer-readable storage medium, stores computer-readable instructions thereon, which, when executed by electronic device, cause the electronic device to perform a facial expression recognition method. The method includes extracting a first feature from color information of pixels in a first image, extracting a second feature of facial key points from the first image, and combining the first feature and the second feature, to obtain a fused feature. The method also includes determining a first expression type of a face in the first image according to the fused feature.

In the embodiments of this application, the first feature is extracted according to the color information of the pixels in the first image, the second feature of the facial key points is extracted from the first image, and the first feature and the second feature are used to determine the first expression type of the face of the object in the first image. By combining (fusing) the image pixel feature and the facial key point feature, the accuracy of recognizing facial expression types can be improved, thereby achieving the technical effect of accurately recognizing facial expressions.

BRIEF DESCRIPTION OF THE DRAWINGS

FIG. 2A to FIG. 2C are flowcharts of a facial expression recognition method according to an embodiment of this application.

FIG. 3 is a schematic diagram of an application scenario of a facial expression recognition method according to an embodiment of this application.

DESCRIPTION OF EMBODIMENTS

Figure 1:
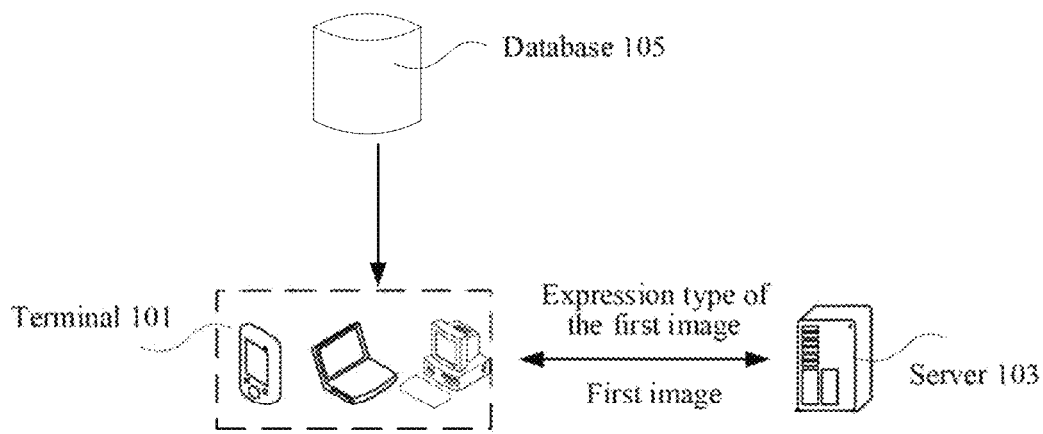
FIG. 1 is a schematic diagram of a hardware environment of a facial expression recognition method according to an embodiment of this application.

In order to make a person skilled in the art better understand the solutions of this application, the following describes the technical solutions in the embodiments of this application with reference to the accompanying drawings in the embodiments of this application. The described embodiments are exemplary embodiments of this application rather than all of the embodiments. Other embodiments may be obtained by a person of ordinary skill in the an based on the embodiments of this application and shall fall within the protection scope of this application.

In this specification, claims, and accompanying drawings of this application, the terms "first" "second", and so on are intended to distinguish similar objects but do not necessarily indicate a specific order or sequence. It is to be understood that the data termed in such a way are interchangeable in appropriate circumstances, so that the embodiments of this application described herein can be implemented in orders other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

First, some terms that appear during descriptions of the embodiments of this application are defined below.

1) RGB color mode, a color standard in the industry, is a mode to reproduce a broad array of colors by changing three color channels of red (R), green (G) and blue (B), and adding them together. The RGB color mode represents colors of the three channels of red, green, and blue.
2) YUV, a color encoding mode, is applicable to various video processing components. The YUV mode, when encoding photos or videos, allows the chrominance bandwidth to be reduced as the mode takes into account human perception. "Y" represents luminance (luma), and "U" and "V" represent chrominance and chroma.
3) Four-color printing mode CMYK, a color register mode used in color printing, uses the principle of color mixing of three primary colors in addition to black ink. A total of four colors are mixed and added together to form a "full-color printing". The four standard colors are respectively: C: Cyan=cyan, also referred to as "sky blue" or "azure blue"; M: Magenta=magenta, also referred to as "fuchsine"; Y: Yellow=yellow; and K: blacK=black.

It has been found during the implementation of the embodiments of this application that the accuracy of the facial expression recognition is affected by the following reasons: the first is that different people's expressions change differently, and facial expressions vary with different expression ways of different persons: the second is that expressions of the same person are real-time in the real world, and expressions of the same person in different time periods, different scenes, and other conditions are also different; and the third is that external conditions, for example, background, illumination, angle, distance, and the like have a great influence on the expression recognition.

In order to solve the above-mentioned problem, an embodiment of this application provides a facial expression recognition method.

The following describes an exemplary application of an electronic device for facial expression recognition provided in an embodiment of this application. The electronic device for facial expression recognition provided in the embodiment of this application may be various types of terminal devices or servers. For example, the terminal may be a server cluster deployed in the cloud, which opens a cloud service to a use, in which a facial expression recognition program is encapsulated. After the user enters first images into the open cloud service, the server deployed in the cloud calls the encapsulated facial expression recognition program to accurately recognize facial expressions from the first images (the embodiment of this application is not limited to facial expressions of humans, but may also facial expressions of animals, cartoon characters, and the like), and applies the recognized facial expressions to the fields of human-computer interaction, autonomous driving, public safety monitoring, medical health, and the like, so as to optimize quality of human life. For example, in the field of human-computer interaction, after recognizing expressions of human face images, a machine can accordingly respond based on the expressions, thereby achieving barrier-free communication between humans and the machine.

In order to facilitate understanding of the technical solution provided in the embodiment of this application, the following describes an application scenario of the facial expression recognition method provided in the embodiment of this application in conjunction with the electronic device for facial expression recognition. For example, the aforementioned facial expression recognition method is applicable to a hardware environment including a terminal 101 and a server 103 as shown in FIG. 1. As shown in FIG. 1, the server 103 is connected to the terminal 101 through a network, and may be configured to provide a service (such as a game service or an application service) to the terminal or a client installed on the terminal. A database 105 may be set up on the server or independent of the server, to provide a data storage service to the server 103. The network includes, but is not limited to, a wide area network, a metropolitan area network, or a local area network. The terminal 101 is not limited to a personal computer (PC), a mobile phone, a tablet computer, and the like. The facial expression recognition method according to the embodiment of this application may be executed by the server 103, by the terminal 101, or by the server 103 and the terminal 101 jointly. That is, the electronic device for facial expression recognition may be the terminal 101 or the server 103. When the terminal 101 performs the method in this embodiment of this application, the method may alternatively be performed by a client installed in the terminal.

In some embodiments, as an exemplary application scenario in which the terminal 101 (the electronic device for facial expression recognition) recognizes facial expressions, the electronic device for facial expression recognition performs the facial expression recognition method provided in the embodiment of this application. The terminal 101 locally performs the facial expression recognition method provided in the embodiment of this application, to recognize facial expressions of first images. For example, an expression recognition application (APP) is installed on the terminal 101. After a user enters a first image into the expression recognition APP, the terminal 101 extracts a first feature from color information of pixels in the first image and extracts a second feature of facial key points from the first image through a neural network model, determines an expression type of a face of an object in the first image according to a fused feature of the first feature and the second feature, and displays the expression type of the first image on a display interface of the terminal 101.

In some embodiments, the terminal 101 may also transmit the first image inputted by the user on the terminal 101 to the server 103 in the cloud via the network, and call the facial expression recognition function (the encapsulated facial expression recognition program) provided by the server 103. The server 103 recognizes the facial expression of the first image by using the facial expression recognition method provided in the embodiment of this application. For example, an expression recognition application is installed on the terminal 101, and a user enters a first image into the expression recognition application. The terminal 101 transmits the first image to the server 103 via the network. After receiving the first image, the server 103 calls the encapsulated facial expression recognition program, extracts a first feature from color information of pixels in the first image and extracts a second feature of facial key points from the first image through a neural network model, and determines an expression type of a face of an object in the first image according to a fused feature of the first feature and the second feature. Then, the server 103 feeds back the expression type of the first image to the expression recognition application of the terminal 101, or directly gives the expression type of the first image.

Figure 2A:
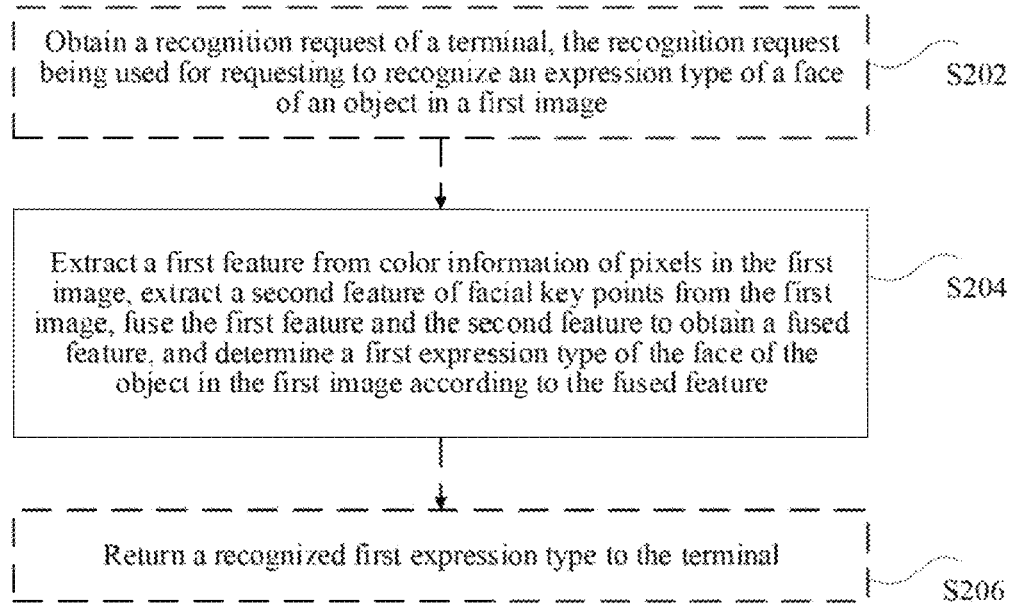

FIG. 2A is a flowchart of a facial expression recognition method according to an embodiment of this application. For example, the following description uses the server as an execution subject. As shown in FIG. 2A, the method may include the following steps (step S202 and step S206 are adaptive optional steps):

In step S202, the server obtains a recognition request of a terminal, the recognition request being used for requesting to recognize an expression type of a face of an object in a first image.

The object herein is an object with expressions, such as humans, orangutans, and the like. To unify the description, the following uses humans as an example.

The facial expression recognition has been further developed and applied in the fields of human-computer interaction, autonomous driving, medical health, and the like. In order to realize the facial expression recognition, the terminal that is configured to realize human-computer interaction, automatic driving, and/or medical health detection may acquire first images of target objects (such as users, drivers, passersby, patients, and the like), and initiate recognition requests to recognize expression types. The expression types herein may include angry, sad, disgust, fear, surprise, happy, neutral, and the like.

In step S204, the server extracts a first feature from color information of pixels in the first image, extracts a second feature of facial key points from the first image, combines (fuses) the first feature and the second feature to obtain a fused feature, and determines a first expression type of the face of the object in the first image according to the fused feature.

The embodiment of this application is not limited to a neural network model, and other machine learning models are also applicable to the embodiment of this application.

The color encoding of the pixels in the first image may be one of color encoding modes such as RGB, YUV and CMYK. For consistency of the description, the following uses RGB as an example. The remaining color encoding modes are similar to RGB and will not be repeated herein.

The above-mentioned first feature is an extracted texture feature that is related to expressions. The second feature is a feature of a facial component (such as at least one of facial features), or a feature of a facial contour. The facial key points are feature points describing the facial component and/or the facial contour.

For example, by training of the neural network model, commonalities of different objects and the same object when making facial expressions can be learned. Based on the first feature (which can accurately represent the facial texture of the object) and the second feature (which can represent the linkage of each facial component and changes in the facial contour, and the like), correlations that are learned in advance between the first and second feature and a facial expression classification can be used to accurately recognize the facial expression of the current object. Besides, even if there are unfavorable factors such as lighting changes, occlusion, and the like, the fusion of the second feature and the first feature can avoid incorrect recognition caused by using the first feature alone (the aforementioned unfavorable factors will lead to inaccurate extraction of the first feature).

In order to recognize the expression type of the first image according to the fused feature of the first feature and the second feature, a fusion (combination) operation may be performed on the first feature and the second feature to obtain the fused feature, and the first expression type of the face of the object in the first image is determined according to the fused feature. The fusion process may be conducted by performing a weighted summation of the first feature and the second feature based on weights of the first feature and the second feature, and using a weighted summation result as the fused feature, to realize the feature fusion of the first feature and the second feature; or, performing linear/non-linear mapping of the first feature and the second feature, and concatenating the first feature and the second feature after the linear/non-linear mapping, to realize the feature fusion of the first feature and the second feature.

Through step S204, the neural network model is used to recognize the first expression type from the first image. The neural network model is configured to extract the first feature according to the color information of the pixels in the first image, extract the second feature of the facial key points from the first image, and use the first feature and the second feature to determine the first expression type of the face of the object in the first image. The fusion of the image feature and the facial key point feature takes account of more features and the correlation between the features, which improves the accuracy of recognizing facial expression types, thereby achieving the technical effect of accurately recognizing facial expressions.

In step S206, the server returns a recognized first expression type to the terminal in response to the recognition request.

Through steps S202 to S206, the server can accurately recognize the facial expression from the first image through the neural network model, and return the facial expression to the terminal. The training of the neural network model is described as follows.

Figure 6A:
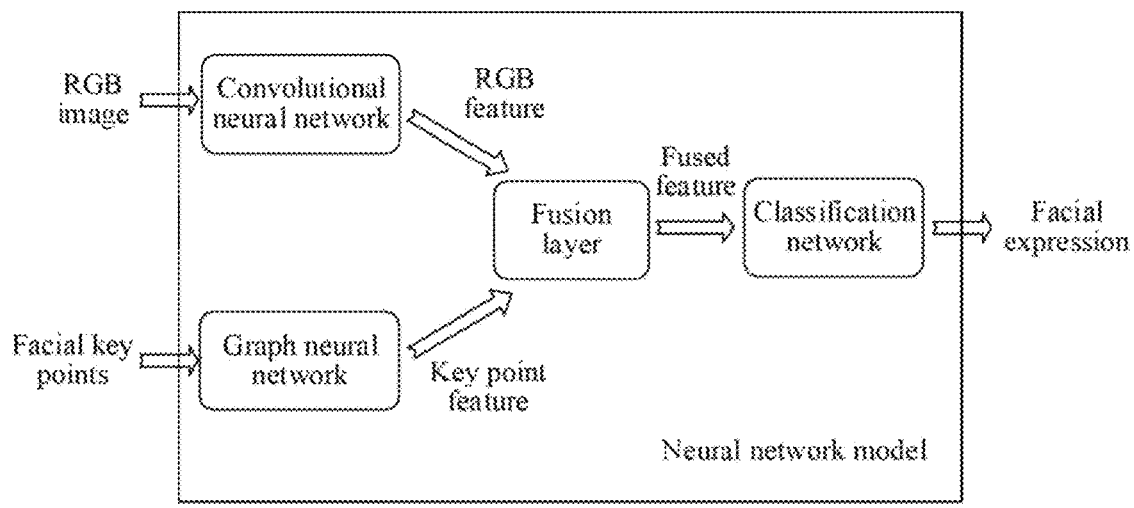
FIG. 6A is a schematic structural diagram of a neural network model according to an embodiment of this application.

The embodiment of this application provides a multi-modal facial expression recognition solution based on an encoded image (such as an RGB image) and facial key points detected using the Landmark recognition models (such as the key points of a human face). As shown in FIG. 6A, the neural network model in the solution includes a convolutional neural network (CNN) configured to extract the first feature (texture feature) of the image, and a graph neural network (GNN) configured to extract the second feature of the facial key points, a fusion layer, and a classification network (which may include fully connected layers and classification layers) that are connected in sequence. This solution uses the CNN to model and learn the RGB image, uses the GNN to model and learn the facial key points, uses the fusion layer to fuse features of the two modalities (RGB images and facial key points) to obtain the fused feature, and uses the classification network to perform the facial expression recognition based on the fused feature. This solution can provide more robust facial expression recognition by modeling the correlation and complementarity between the RGB image and the facial key points; and can more flexibly and efficiently describe the correlations between the facial key points by the GNN, so as to extract the facial key point feature with stronger discriminative ability. The embodiment of this application is not limited to the CNN and the GNN, and other models may also be used to realize the feature extraction of the RGB image and the facial key points. The technical solution of this application is further described below in detail with reference to steps shown in FIG. 2.

Figure 2B:
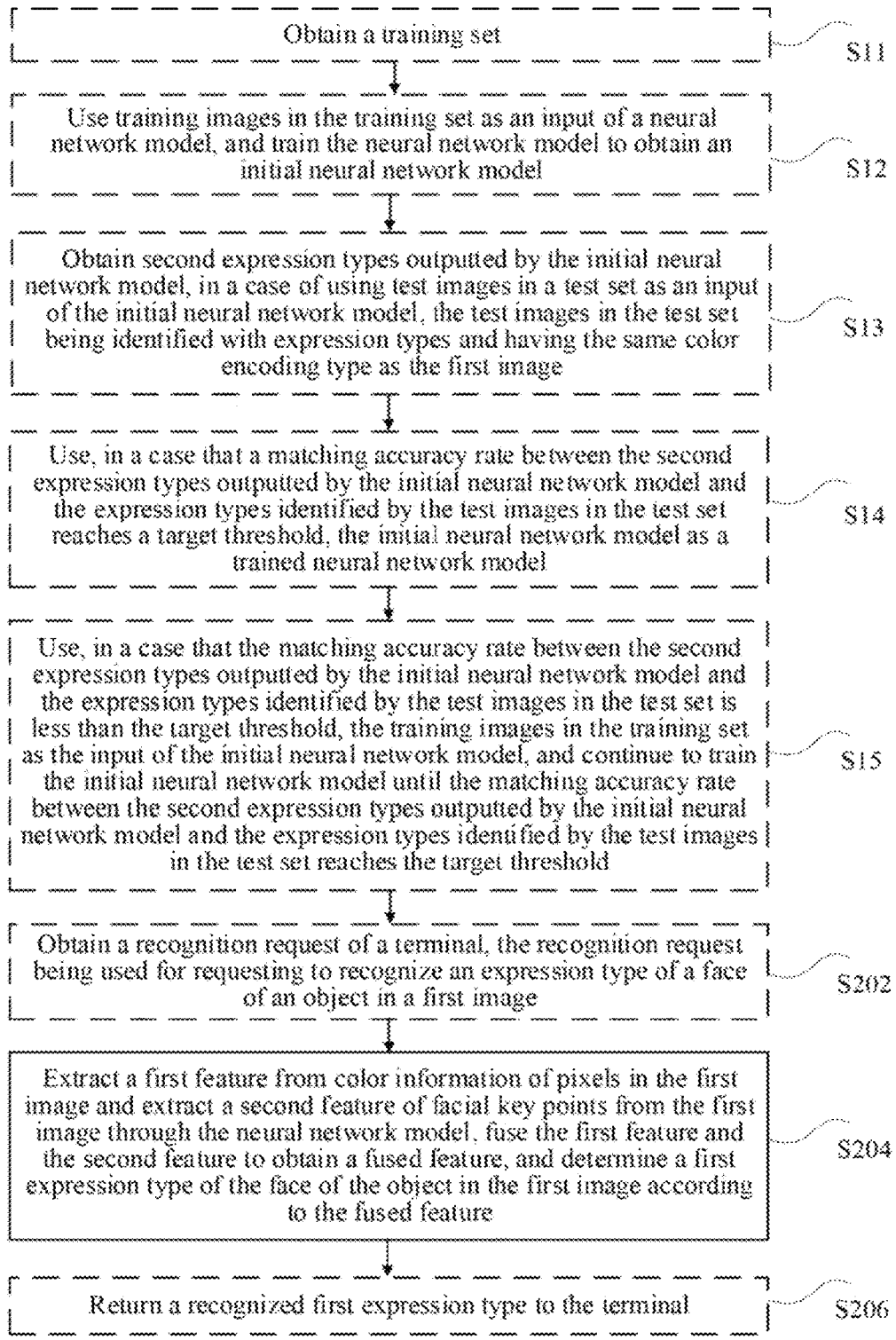

FIG. 2B shows that the neural network model may be pre-trained in the following manner before performing step S202 in FIG. 2A. A training set is inputted into the neural network model, and the neural network model outputs predicted results. Since there are errors between the predicted results of the neural network model and actual results, the errors between the predicted results and the actual results are calculated, and then the errors are propagated back in the neural network model, so as to adjust parameter values of all layers in the neural network model. All layers include the CNN, the GNN, the fusion layer, and the classification network. The above process is iterated until convergence is reached, to complete the training of the neural network model;

In step S11, a training set is obtained, training images in the training set being identified with expression types and having the same color encoding type as the first image.

For example, a dataset (such as the AffectNet facial expression dataset) may be obtained in advance, and images in the dataset are divided into a training set and a test set. The division manner may be a random division, so that features of images in the training set and in the test set have the same or approximately the same distribution. In terms of proportions of the images, a number of images in the training set is generally greater than a number of images in the test set. For example, the images in the training set account for 80% of the dataset, and the images in the test set account for 20% of the dataset.

In step S12, the training images in the training set are used as an input of the neural network model, and train the neural network model to obtain an initial neural network model. The initial neural network model is obtained after initializing weights of network layers in the neural network model by using the training images in the training set as the input and using the expression types identified by the training images as an expected output.

In the neural network model, each neuron has an input connection and an output connection. These connections simulate behaviors of synapses in the brain. Similar to the way that the synapses in the brain transmit signals, the signals are transmitted from one neuron to another. Each connection has a weight, that is, a value transmitted to each connection is multiplied by this weight. The weight is actually equivalent to the quantity of neurotransmitters transferred between biological neurons. A weight of a certain important connection is greater than weights of those unimportant connections. The training process is a process of assigning these weights. Supervised learning may be adopted in this technical solution. The training set includes the inputs (such as RGB encoding of images and face images in the graph data structure) and the expected outputs (i.e., facial expression types). In this way, the network can check differences between its calculation results and the expected outputs, and take appropriate processing accordingly.

Each training image in the training set includes an input value and an expected output. A corresponding error can be calculated using an error function each time after the network calculates an output of one input (the weight values may be randomly assigned initially). This error indicates how close the actual output of the model is to the expected output. The error function used herein is the mean square error function, as shown in formula (1):

$$C(w, b) \equiv \frac{1}{2n} \sum_{x} \|y(x) - a\|^2 \quad (1)$$

where x represents an input in the training set, y(x) represents an output generated by the neural network model, and a represents an expected output. It can be seen that the mean square error function is a function of w and b, w representing weights, and b representing biases. Each time after obtaining the output, the corresponding error is returned back to the neural network model, and the weights are adjusted accordingly, such that the neural network model can complete an adjustment of all weights through the algorithm. This process is repeated until the amount of training images reaches a certain value.

In step S13, second expression types outputted by the initial neural network model are obtained by using test images in a test set as an input of the initial neural network model. The test images in the test set are identified with expression types and have the same color encoding type as the first image.

In step S14, in response to a determination that a matching accuracy rate between the second expression types outputted by the initial neural network model and the expression types identified in the test images in the test set reaches (is greater than or equal to) a target threshold, the initial neural network model is used as a trained neural network model.

The above-mentioned matching accuracy rate is obtained by calculating the output of the initial neural network model for the test images. For example, if 95 test images of the 100 test images can be correctly identified, the matching accuracy rate is 95%. When the target threshold is 98%, since the actual correct matching rate is less than the target threshold, it indicates that the model is under-fitting, and it is necessary to continue training the initial neural network model. If 99 test images of the 100 test images can be correctly identified, the model is relatively mature and can be put into practical application.

In step S15, in response to a determination that the matching accuracy rate between the second expression types outputted by the initial neural network model and the expression types identified in the test images in the test set is less than the target threshold, the training images in the training set are used as the input of the initial neural network model, and continue to train the initial neural network model until the matching accuracy rate between the second expression types outputted by the initial neural network model and the expression types identified in the test images in the test set reaches (is greater than or equal to) the target threshold.

The model after being trained in the above manner can be used to recognize facial expression types. In the technical solution provided in step S202, the server obtains the recognition request of the terminal, the recognition request being used for request recognition of the expression type of the face of the object in the first image. The recognition request may directly be the first image, or a request message carrying indication information of the first image (such as an image logo, a storage address, and the like of the first image).

In the technical solution provided in step S204, the server determines the first expression type of the face of the object in the first image from the first image. FIG. 2C shows that step 204 in FIG. 2A includes step S2042 to step S2044.

In step S2042, the first feature representing the texture in the first image based on the color information of the pixels in the first image is extracted using the CNN, and the second feature representing correlations between the facial key points is extracted using the GNN, the facial key points representing the components and/or the facial contours of the face of the object.

For example, the extracting the first feature representing the texture in the first image based on the color information of the pixels in the first image includes: using color encoding data (such as RGB encoding data of the first image) of the pixels in the first image as the input of the CNN, the CNN performing a convolution operation on the color encoding of the pixels in the first image, to obtain the first feature, such as a feature describing that eye corners lift up when smiling; and obtaining the first feature.

In some embodiments, in order to enhance the recognition accuracy, the first image may be preprocessed, to make its resolution, length and width, and reference points meet requirements. When the color encoding of the pixels in the first image is used as the input of the CNN, if a position where a reference point in the first image is located in the first image is different from a position where a reference point in an image template is located in the image template, a cropping operation and/or a scaling operation is performed on the first image, such as the following. The operations may involve moving the first image to make its reference point coincide with the reference point of the template in position, and/or scaling with the reference point as an origin to make a resolution of the first image to be the same as that of the template. Other operations may involve cropping the first image to make its length and width to be the same as those of the template, so as to obtain a second image, a position of a reference point in the second image being the same as the position of the reference point in the image template. Subsequently, the color encoding of pixels in the second image is used as the input of the CNN.

For example, before determining a second face image according to a first face image (or before processing the first face image), a plurality of third images may be used to determine facial key points, correlation relations between the key points, and correlation weights between the key points. The third images are images that are identified with expression types. The plurality of third images (images all with obvious facial expressions) may be analyzed to determine most relevant key points (namely points having a range of motion or representing an expression when affected by the expression) around the facial features and on facial contours that are directly related to expressions. The key points having a correlation refer to points that can produce a linkage under the same expression. A correlation weight is obtained after processing (such as normalizing) a degree of the correlation between two key points (for example, using an empirical value based on studies of different groups of people). The facial key points are taken as nodes, edges that are located between the nodes and used for representing that there are the correlations between the facial key points are connected, and the correlation weights between the key points that have the correlations are used as weights of the edges, so as to obtain the first face image.

The second face image (or a processed first image) may be determined according to the first face image when extracting the second feature used for representing the correlations between the facial key points. The processed first face image includes the nodes representing the facial key points, the edges that are located between the nodes and represent the correlations between the facial key points, and the correlation weights of the edges. The second face image (or processed first image) is obtained by adding positions where the facial key points corresponding to the nodes are located in the first image into the first face image. The feature extraction is performed on the second face image (or the processed first image) to obtain the second feature.

In step S2044, the classification network, which has learned correspondences between different first and second features and different expression types through pre-training, identifies, from a plurality of expression types, the first expression type corresponding to the first feature and the second feature.

In some embodiments, the facial expression recognition solution based on RGB images and a facial expression recognition solution based on facial key points are used. The expression recognition solution based on RGB images is mainly to extract features (namely the first features) related to expressions from face images and perform the classification. However, since RGB images are greatly affected by changes in illumination, occlusion, and other factors, the facial expression recognition system that relies only on RGB image data has weak robustness. In the expression recognition solution based on facial key points, the facial key points mainly refer to the points where the facial features and the facial contours are located. The location information of these points is closely related to facial expressions. The more accurate the prediction of the facial key points is, the more accurate the facial expression recognition based on the key points is. Furthermore, in the facial expression recognition based on facial key points, manually selected features can be used, and a shallow model can be used for the classification, for example, a support vector machine (SVM) model is used to perform expression classification. Because the facial key points have rich structural information and there are close correlations between different key points, the solution is able to accurately recognize facial expressions. However, if the manually selected features are used, it is impossible to flexibly and effectively model rich and complex associations between different key points, resulting in poor facial expression recognition performance based on key points.

The expression recognition based on the RGB image can obtain richer facial texture information, but is not very robust to changes in lighting; while the expression recognition based on the facial key points is more robust to changes in lighting, but does not take into account most of the texture information. The fusion of the RGB image and the facial key points is advantageous for facial expression recognition. The embodiments of this application provide a multi-modal facial expression recognition solution based on the RGB image and the facial key points. This solution utilizes the complementarity of the RGB image and the facial key points to achieve more robust facial expression recognition. Aiming at the problem that the hand-crafted features cannot efficiently describe the correlations between the facial key points, this solution uses the GNN to flexibly and efficiently model the facial key points. The GNN can adaptively learn the correlations between the key points, thereby significantly improving the performance of the facial expression recognition based on the key points.

In the technical solution provided in step S206, the server returns the recognized first expression type to the terminal in response to the recognition request.

For example, after returning the recognized first expression type to the terminal, the server may obtain feedback information of the terminal. The feedback information is used for indicating whether the recognized first expression type is correct. If the feedback information indicates that the recognized first expression type is incorrect, the neural network model is trained using fourth images with the same image feature as the first image. The fourth images may be images with the same facial expression type or the same background type as the first image. The adoption of this technical solution enables targeted improvement of the weakness of the neural network model.

Figure 4:
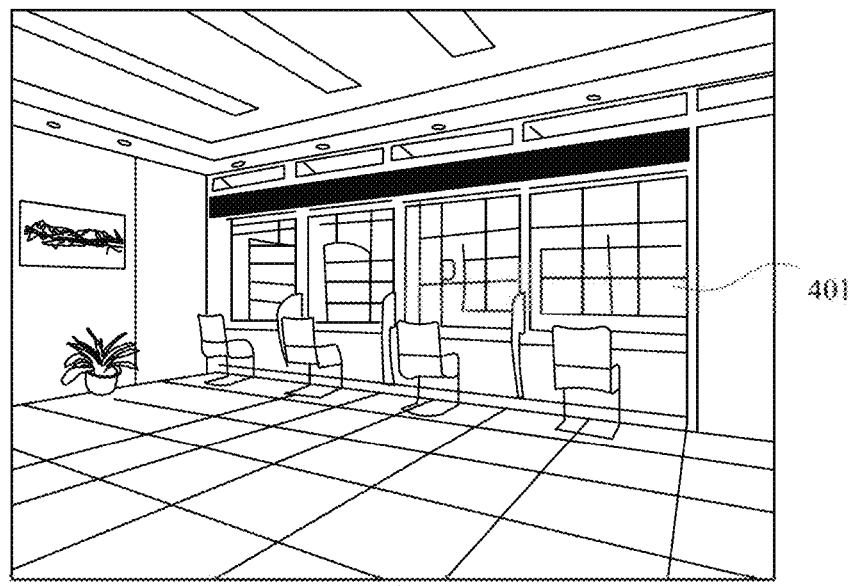
FIG. 4 is a schematic diagram of an application scenario of a facial expression recognition method according to an embodiment of this application.
Figure 5:
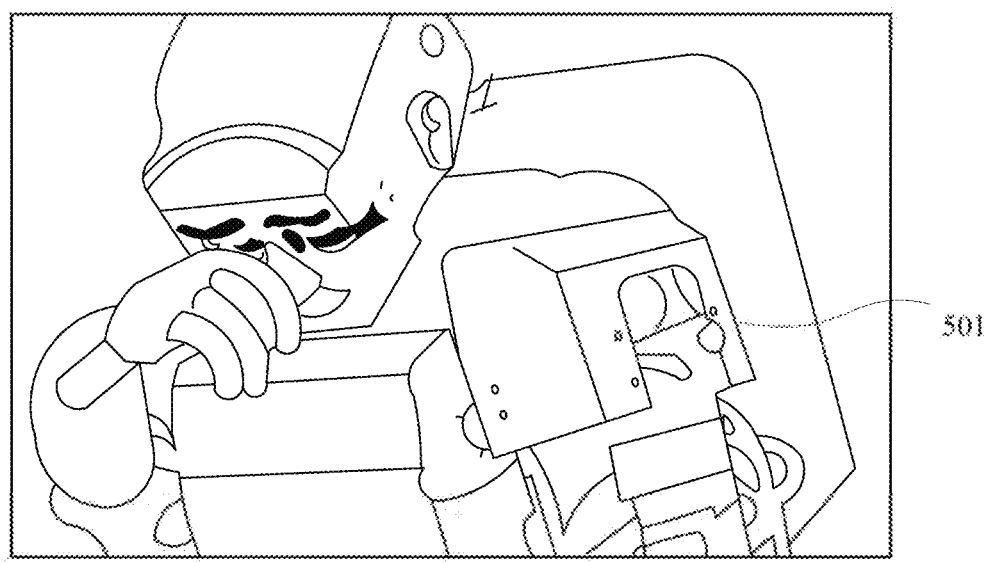
FIG. 5 is a schematic diagram of an application scenario of a facial expression recognition method according to an embodiment of this application.

The facial expression recognition has been developed and applied in the fields of human-computer interaction, autonomous driving, medical health, and the like. For example, the embodiments of this application may be used to assist robots in recognizing human emotions and psychology, thereby improving user experience in human-computer interaction products. For example, as shown in FIG. 3, when recognizing that a person is making an angry expression, a robot 301 may tell jokes to release the person's emotion, thereby enhancing the user experience. The embodiments of the application may also be used in shopping malls, banks, and other places for customer satisfaction analysis. For example, as shown in FIG. 4, facial expressions of customers during transactions are captured by a monitor in a bank service window 401, and the facial expressions in a surveillance video are analyzed, so as to determine customer transaction satisfaction. The embodiments of the application may also be used for simulation and generation of animated expressions, such as recognizing real facial expressions and naturally transferring them to animated images. For example, as shown in FIG. 5, when recognizing that a person is making a sad expression, an animated image 501 also presents a corresponding sad expression. The technical solution of this application is described in detail below in conjunction with the embodiments.

Figure 6B:
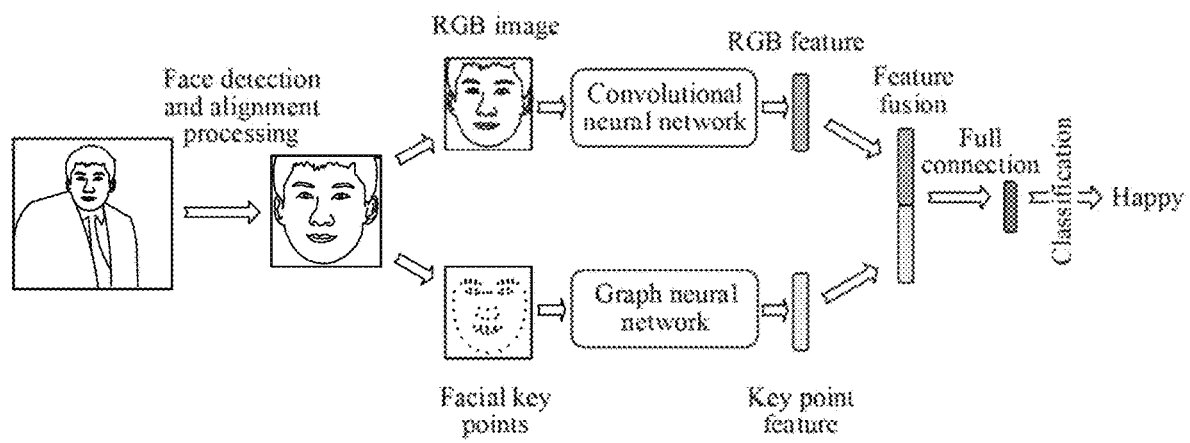
FIG. 6B is a schematic diagram of a facial expression recognition framework according to an embodiment of this application.

An embodiment of this application provides a multimodal facial expression recognition system based on an RGB image and facial key points. FIG. 6B shows a multimodal facial expression recognition framework. For a given image to be recognized, first, face detection and face alignment are performed, and facial key point information is extracted; then, the CNN is used to adaptively learn the RGB image feature, and the GNN is used to adaptively model the correlations between the facial key points and learn the key point feature. The obtained RGB feature and key point feature are fused for the final classification. The entire recognition system can achieve end-to-end training and prediction.

Figure 7:
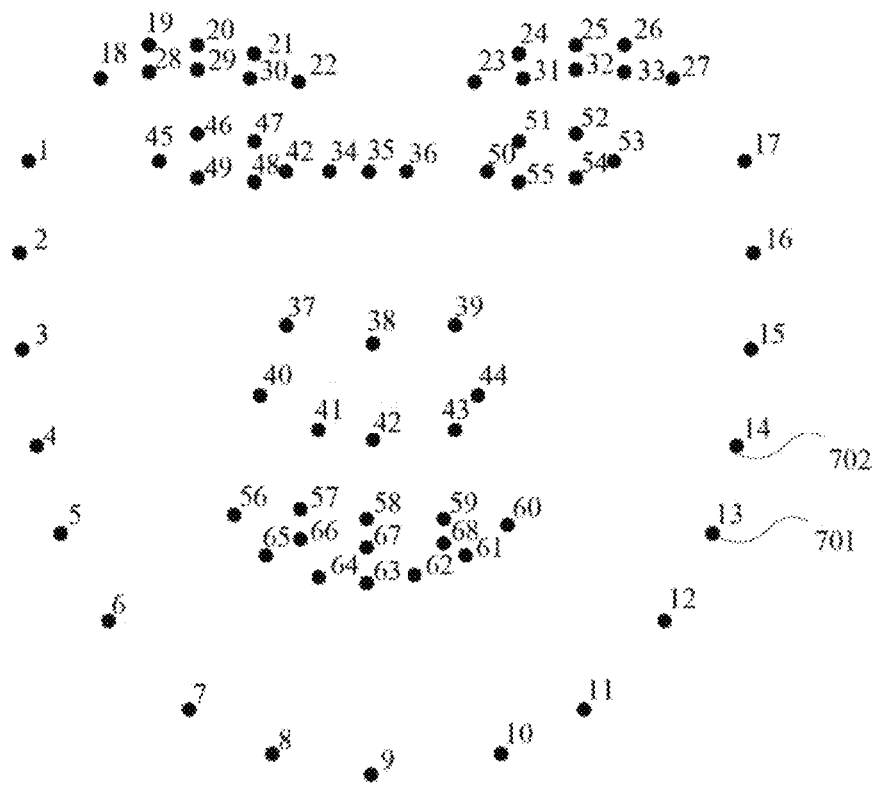
FIG. 7 is a schematic diagram of facial key points according to an embodiment of this application.

During the learning of the facial key point features, an aligned face image may be given, and the model first extracts the facial key point information from the aligned face image. As shown in FIG. 7, for example, key points 701-702 are points representing a facial contour. The facial key points (such as the points shown in numbers 1-68) are used for locating facial key areas, such as the facial contour, the eyebrows, the eyes, the nose, the mouth, and the like. When the same person makes different expressions, the positions of the facial key points are usually different, so the facial key point information can be used to assist the facial expression recognition. Typically, there are complex correlations between the facial key points. For example, the positions of the key points round the eyebrows and the eyes usually change together in a "surprise" expression. If handcrafted features, such as stacking of the key point position information or distances between different key points, are used in the facial expression recognition based on key point information, since these hand-crafted features cannot effectively model the correlations between the key points, the obtained key point feature has a poor discrimination ability, thereby resulting in poor recognition accuracy rate on large-scale facial expression recognition dataset.

Figure 8:
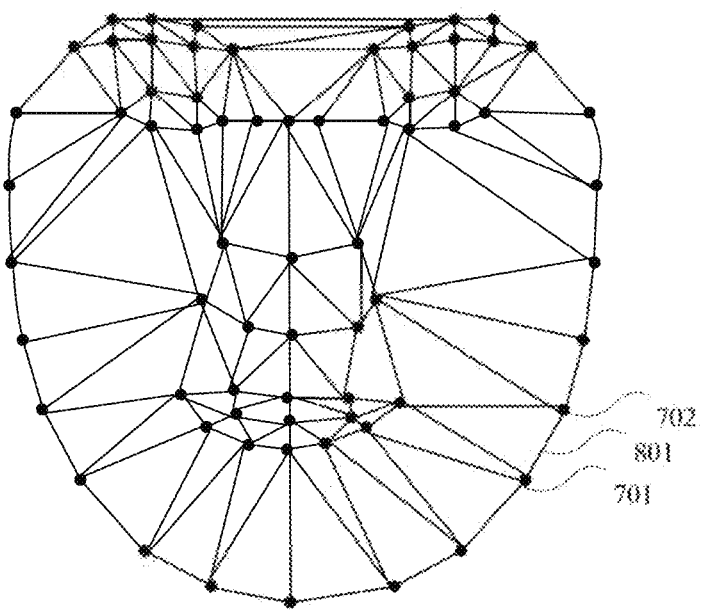
FIG. 8 is a schematic diagram of a face graph network structure according to an embodiment of this application.

In order to better model and utilize the correlations between the facial key points, an embodiment of the application uses the GNN to efficiently model the facial key points. The face image is regarded as highly structured data, and the facial key points are formed into a graph network structure according to the distribution of the facial features. As shown in FIG. 8, each vertex in the figure represents a facial key point, and each edge represents a correlation between the facial key points, for example, an edge 801 represents the correlation between a contour key point 701 and a contour key point 702. $X_{landmark}$ denotes inputted facial key point information, A denotes a graph adjacency matrix, $A_{ij}=1$ denotes that there is an edge between an i-th key point and a j-th key point, and $A_{ij}=0$ denotes that there is no edge between the i-th key point and the j-th key point. The learning of the facial key point feature based on the GNN is as shown in formula (2):

$$Y_{landmark}=f_{gcn}(X_{landmark},A) \qquad (2)$$

where $f_{gcn}$ represents the GNN. The graph adjacency matrix A is a 0-1 matrix, which can only indicate whether there are correlations between the key points, but cannot measure weights of different edges. The strengths of the correlations between different key points are different. In order to better measure the correlations between different key points, an embodiment of this application introduces a learnable parameter W, and the learning of the facial key point feature based on the GNN is as shown in formula (3):

$$Y_{landmark}=f_{gcn}(X_{landmark},A \otimes W) \qquad (3)$$

where $A \otimes W$ is a modified adjacency matrix with weights, the weights W are determined through adaptive learning, and $Y_{landmark}$ represents a feature obtained from the facial key points.

When learning the RGB image feature, the RGB image feature is extracted from the RGB image. The RGB image is directly obtained from the face image after the face detection and alignment processing. Since the CNN has achieved remarkable results in the fields of image feature learning and image recognition, an embodiment of this application uses the CNN to extract the RGB image feature. Let $X_{rgb}$ denotes an original RGB input of the image, and the RGB image feature obtained according to an embodiment of this application is as shown in formula (4):

$$Y_{rgb} = f_{cnn}(X_{rgb}) \quad (4)$$

where $f_{cnn}$ is the CNN based on the RGB image, and $Y_{rgb}$ denotes the learned RGB image feature.

When performing multi-modal feature fusion through the fusion layer, RGB image information and facial key point information complement each other. In this method, the learned facial key point feature $Y_{landmark}$ and RGB image feature $Y_{rgb}$ are fused, to obtain an overall feature Y, as shown in formula (5):

$$Y = g(Y_{landmark}, Y_{rgb}) \quad (5)$$

where g represents feature fusion. A fully connected network is used to perform the expression classification based on the fused feature Y. The entire neural network structure includes a facial key point feature extraction branch $f_{gcn}$, an RGB image feature extraction branch $f_{cnn}$, and the fully connected classification network that can achieve end-to-end training. During the network training process, a weighted loss function is minimized, so as to alleviate serious category imbalance in the facial expression recognition.

The weighted summation is performed on the facial key point feature $Y_{landmark}$ and the RGB image feature $Y_{rgb}$, and the weighted summation result is used as the fused feature Y, so as to achieve feature fusion. The predication is performed on the fused feature Y through the fully connected network to obtain an expression of the face image. When the facial key point feature has a relatively large contribution to the facial expression recognition, the weight of the facial key point feature is greater than that of the RGB image feature $Y_{rgb}$. According to the relationship between the fused feature of the facial key point feature and the RGB image feature and the facial expression classification learned through the fully connected network, a facial expression of a current object can be accurately recognized. Besides, even if there exits unfavorable factors such as changes in lighting, occlusion, and the like, the fused feature can be used to avoid incorrect recognition caused by using the RGB image feature alone (the aforementioned unfavorable factors may lead to inaccurate extraction of the RGB image feature). Alternatively or additionally, the linear/non-linear mapping is performed on the facial key point feature $Y_{landmark}$ and the RGB image feature $Y_{rgb}$; the facial key point feature $Y_{landmark}$ and the RGB image feature $Y_{rgb}$ after the linear/non-linear mapping are concatenated, and a result of the concatenation is used as the fused feature Y to realize the feature fusion. Predication is performed on the fused feature Y through the fully connected network to obtain the expression of the face image. The linear/non-linear mapping is a calculation manner of various deformations, and is not limited to a certain calculation manner.

In order to verify the effectiveness of the method of this application, this method uses the AffectNet facial expression dataset, which includes seven basic facial expressions: angry, disgust, fear, happy, neutral, sad, and surprise. Distributions of data (including a training set, and a validation set, also referred to as a test set) are shown in Table 1 below:

TABLE 1

|  | Angry | Disgust | Fear | Happy | Neutral | Sad | Surprise |
|---|---|---|---|---|---|---|---|
| Training set | 2532 | 4303 | 6878 | 134915 | 75374 | 25959 | 14590 |
| Validation set | 500 | 500 | 500 | 500 | 500 | 500 | 500 |

Data distributions of the seven basic expressions in the AffectNet dataset are shown in Table 2.

TABLE 2

|  | Angry | Disgust | Fear | Happy | Neutral | Sad | Surprise | Average |
|---|---|---|---|---|---|---|---|---|
| Landmark-Linear | 11.4 | 28.4 | 9.6 | 67.6 | 10.2 | 35.6 | 39.3 | 28.9 |
| Landmark-SVM | 20.7 | 0.0 | 0.0 | 100.0 | 3.3 | 2.9 | 9.8 | 19.5 |
| Landmark-GCN | 46.1 | 47.2 | 47.4 | 80.3 | 47.5 | 43.0 | 47.5 | 51.3 |

Recognition accuracy rates and average recognition accuracy rates of different facial key point models in seven expressions are shown in Table 3.

TABLE 3

|  | Angry | Disgust | Fear | Happy | Neutral | Sad | Surprise | Average |
|---|---|---|---|---|---|---|---|---|
| RGB image | 56.5 | 46.0 | 58.6 | 85.8 | 60.2 | 60.0 | 58.8 | 60.8 |
| Landmark-GCN | 46.1 | 47.2 | 47.4 | 80.3 | 47.5 | 43.0 | 47.5 | 51.3 |
| RGB image + Landmark-GCN | 58.1 | 46.8 | 57.7 | 86.5 | 60.4 | 59.0 | 59.2 | 61.1 |

Since the expression recognition based on the GNN is used, in order to verify the effectiveness of the facial key point feature extraction based on the GNN provided in this application, Table 2 shows the recognition accuracy rates of the expression recognition model (Landmark-GCN) based on the key point feature extracted by the GNN in the seven expressions in AffectNet. In Table 2, the last column is an average recognition accuracy rate. Table 2 also shows classification accuracy rates of key point facial expression recognition models based on hand-crafted features, the models including: a linear classification model (Landmark-Linear) and an SVM classification model (Landmark-SVM). It can be seen that the facial key point feature extracted by the GNN provided in this method in Table 3 has good discriminability, and the recognition effect is significant better than those of the models based on hand-crafted features.

Table 3 shows the recognition accuracy rates and the average recognition accuracy rates of the expression recognition based on the RGB image feature, the expression recognition based on the facial key points extracted by the GNN, and the expression recognition based on the multi-modal fusion of the embodiments of the present application, using the AffectNet seven expressions. It can be seen that the multi-modal expression recognition method based on the RGB image and the facial key points provided in the embodiments of this application has the highest average recognition accuracy rate.

This application provides a facial expression recognition method based on multi-modal information fusion. This method takes into account the complementary information of the RGB image and the facial key points, which can significantly improve the accuracy of facial expression recognition. This application is applicable to improving user experience in human-computer interaction products, assisting shopping malls and banks in analyzing customer satisfaction, and assisting in the simulation and generation of animated expressions.

An embodiment of this application constructs the graph network structure of the facial key points based on the facial structure information. The quantity and positions of the facial key points are not limited to those shown in FIG. 7, and the graph network structure of the facial key points is not limited to that shown in FIG. 8. Any quantity of key points and any graph network structure may be used. The embodiment of this application uses the CNN and the GNN to respectively model the RGB image and the facial key points, and is not limited to a CNN or a GNN of a certain type.

For ease of description, the foregoing method embodiments are stated as a combination of a series of actions. However, this application is not limited to the described action sequences, because according to this application, some steps may be performed in another sequence or simultaneously. In addition, a person skilled in the art is also to understand that the embodiments described in this specification are all exemplary embodiments, and the involved actions and modules are not necessarily required to this application.

According to the descriptions in the foregoing implementations, the method according to the foregoing embodiment may be implemented by software plus a hardware platform, or by using hardware. Based on such an understanding, the technical solutions of this application may be implemented in the form of a software product. The computer software product is stored in a non-transitory computer-readable storage medium (such as a read-only memory (ROM)/random access memory (RAM), a magnetic disk, or an optical disc), and includes several instructions for instructing a terminal device (which may be a mobile phone, a computer, a server, a network device, or other hardware) to perform the method described in the embodiments of this application.

Figure 9:
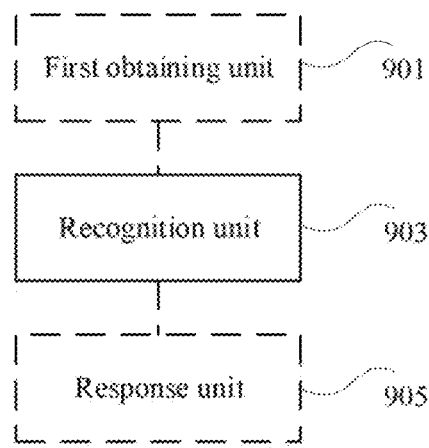
FIG. 9 is a schematic diagram of a facial expression recognition apparatus according to an embodiment of this application.

An embodiment of this application provides a facial expression recognition apparatus for implementing the above-mentioned facial expression recognition method. FIG. 9 is a schematic diagram of a facial expression recognition apparatus according to an embodiment of this application. As shown in FIG. 9, the apparatus may include: a first obtaining unit 901, a recognition unit 903, and a response unit 905 (in the embodiment of this application, the first obtaining unit 901 and the response unit 905 are optional). One or more of the units can be implemented by processing circuitry, software, or a combination thereof, for example.

The first obtaining unit 901 is configured to obtain a recognition request of a terminal. The recognition request requests recognition of an expression type of a face of an object in a first image.

The recognition unit 903 is configured to extract a first feature from color information of pixels in a first image, extract a second feature of facial key points from the first image, and combine (fuse) the first feature and the second feature, to obtain a fused feature. The recognition unit 903 is further configured to determine a first expression type of a face of an object in the first image according to the fused feature.

The response unit 905 is configured to return the recognized first expression type to the terminal in response to the recognition request.

The first obtaining unit 901 in the embodiments may be configured to perform step S202 in this embodiment of this application, the recognition unit 903 in this embodiment may be configured to perform step S204 in the embodiments of this application, and the response unit 905 in the embodiments may be configured to perform step S206 in the embodiments of this application.

Examples implemented by the foregoing modules and corresponding steps and application scenarios of the foregoing modules and corresponding steps are the same, but are not limited to the content disclosed in the foregoing embodiments. The foregoing modules may be run in the hardware environment shown in FIG. 1 as a part of the apparatus, and may be implemented by software, or may be implemented by hardware.

Through the above modules, the first expression type can be recognized from the first image using the neural network model. The neural network model is configured to extract the first feature according to the color information of the pixels in the first image, extract the second feature of the facial key points from the first image, and determine the first expression type of the face of the object in the first image based on the first feature and the second feature. The fusion of the image feature and the facial key point feature can improve the accuracy of recognizing facial expression types, thereby achieving the technical effect of accurately recognizing facial expressions.

In some embodiments, the recognition unit may include a processing module, configured to extract the first feature representing a texture in the first image from the color information of the pixels in the first image through a CNN, and extract the second feature representing correlations between the facial key points through a GNN, the facial key points representing components and/or a facial contour of the face of the object. The processing module of the recognition unit may further be configured to perform a feature fusion operation on the first feature and the second feature, to obtain the fused feature through a fusion layer, and configured to recognize, from a plurality of expression types, the first expression type corresponding to the fused feature through a classification network.

In some embodiments, the processing module is further configured to: perform a weighted summation of the first feature and the second feature based on weights of the first feature and the second feature, and use a weighted summation result as the fused feature, or configured to concatenate the first feature and the second feature, to obtain the fused feature.

In some embodiments, the processing module is further configured to: use color encoding of the pixels in the first image as an input of the CNN, the CNN being configured to perform a convolution operation on the color encoding of the pixels in the first image, to obtain the first feature; and obtain the first feature outputted by the CNN.

In some embodiments, the processing module, when using the color encoding of the pixels in the first image as the input of the CNN, is further configured to: perform, in response to a determination that a position of a reference point in the first image different from a position of a reference point in an image template, a cropping operation and/or a scaling operation on the first image to obtain a second image, to make the position of a reference point in the second image the same as the position of the reference point in the image template: and use color encoding of pixels in the second image as the input of the CNN.

In some embodiments, the processing module is further configured to: add positions of the facial key points corresponding to nodes in the first image to obtain a face image, the face image including the nodes representing the facial key points, edges that are located between the nodes and representing correlation relations between the facial key points, and correlation weights of the edges; and perform feature extraction on the second face image, to obtain the second feature.

In some embodiments, the processing module is further configured to: determine the facial key points, the correlation relations between the facial key points, and the correlation weights of the edges between the facial key points according to a plurality of third images, the third images being images identified with expression types; take the facial key points as the nodes, connect the edges that are located between the nodes and representing the correlation relations between the facial key points, and use the correlation weights between the key points that have the correlation relationships as the correlation weights of the edges, to obtain the face image.

In some embodiments, the apparatus may further include: a second obtaining unit, configured to obtain a training set, training images in the training set being identified with expression types and having the same color encoding type as the first image. The apparatus may further include a training unit, configured to use the training images in the training set as an input of the neural network model, and train the neural network model to obtain an initial neural network model. The initial neural network model is obtained after initializing weights of network layers in the neural network model by using the training images in the training set as the input and using the expression types identified in the training images as an expected output. The apparatus may further include a third obtaining unit, configured to obtain, in by using test images in a test set as an input of the initial neural network model, second expression types outputted by the initial neural network model, the test images in the test set being identified with expression types and having the same color encoding type as the first image. The apparatus may further include a determining unit, configured to use, in response to a determination that a matching accuracy rate between the second expression types outputted by the initial neural network model and the expression types identified in the test images in the test set reaches (is greater than or equal to) a target threshold, the initial neural network model as a trained neural network model. The training unit is further configured to use, in response to a determination that the matching accuracy rate between the second expression types outputted by the initial neural network model and the expression types identified in the test images in the test set is less than the target threshold, the training images in the training set as the input of the initial neural network model, and continue to train the initial neural network model until the matching accuracy rate between the second expression types outputted by the initial neural network model and the expression types identified by the test images in the test set (is greater than or equal to) the target threshold.

In some embodiments, the apparatus may further include: a feedback unit, configured to obtain feedback information. The feedback information indicates whether the recognized first expression type is correct. In response to a determination that the feedback information indicates that the recognized first expression type is incorrect, fourth images with the same image feature as the first image are used to train the neural network model.

Examples implemented by the foregoing modules and corresponding steps and application scenarios of the foregoing modules and corresponding steps are the same, but are not limited to the content disclosed in the foregoing embodiments. The modules may be run in the hardware environment shown in FIG. 1 as a part of the apparatus, and may be implemented through software, or may be implemented through hardware. The hardware environment includes a network environment.

An embodiment of this application provides a server or a terminal used to implement the above-mentioned facial expression recognition method.

Figure 10:
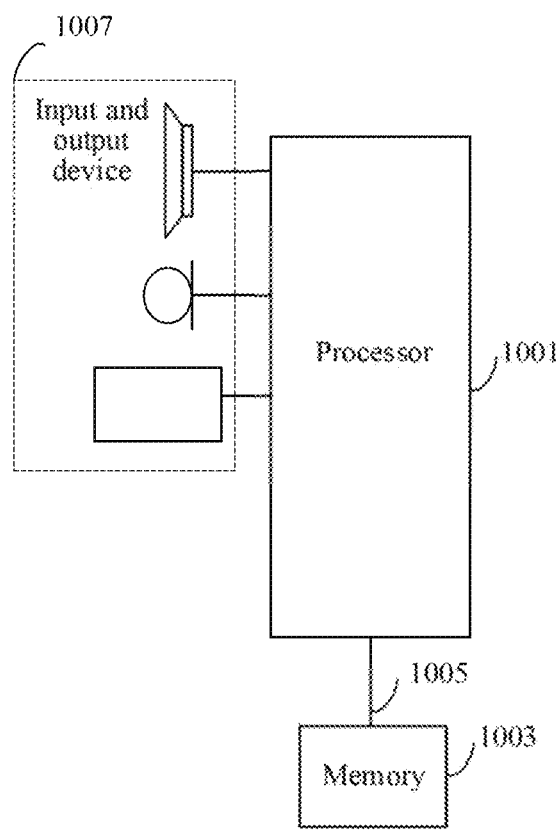
FIG. 10 is structural block diagram of a terminal according to an embodiment of this application.

FIG. 10 is a structural block diagram of a terminal according to an embodiment of this application. As shown in FIG. 10, the terminal may include one or more processors 1001 (only one processor is shown in FIG. 10), a memory 1003, and a transmission apparatus 1005. As shown in FIG. 10, the terminal may further include an input/output device 1007.

The memory 1003 may be configured to store a software program and a module, for example, a program instruction/module corresponding to the image recognition method and apparatus in the embodiments of this application, and the processor 1001 includes processing circuitry that performs various functional applications and data processing by running a software program and a module stored in the memory 1003, that is, implementing the foregoing image recognition method. The memory 1003 may include a high-speed random access memory, and may also include a non-volatile memory, for example, one or more magnetic storage apparatuses, a flash memory, or another non-volatile solid-state memory. In some embodiments, the memory 1003 may further include memories remotely disposed relative to the processor 1001, and the remote memories may be connected to a terminal through a network. Examples of the network include, but are not limited to, the Internet, an intranet, a local area network, a mobile communication network, and a combination thereof.

The transmission apparatus 1005 is configured to receive or send data by using a network, or may further be configured to transmit data between the processor and the memory. Examples of the foregoing network may include a wired network and a wireless network. In an example, the transmission apparatus 1005 includes a network interface controller (NIC). The NIC may be connected to another network device and a router by using a network cable, so as to communicate with the Internet or a local area network. In an example, the transmission apparatus 1005 is a radio frequency (RF) module, which communicates with the Internet in a wireless manner.

The memory 1003 is configured to store an application program.

The processor 1001 may invoke, by using the transmission apparatus 1005, the application stored in the memory 1003, to perform obtaining a recognition request of a terminal, the recognition request being used for requesting to recognize an expression type of a face of an object in a first image. The application may further cause the processor 1001 to perform extracting a first feature from color information of pixels in the first image, extracting a second feature of facial key points from the first image, and fusing the first feature and the second feature, to obtain a fused feature. The application may further cause the processor 1001 to perform determining a first expression type of the face of the object in the first image according to the fused feature; and returning the recognized first expression type to the terminal in response to the recognition request.

The processor 1001 is further configured to perform the following steps: obtaining a training set, training images in the training set being identified with expression types and having the same color encoding type as the first image, and using the training images in the training set as an input of the neural network model, and training the neural network model to obtain an initial neural network model. The initial neural network model is obtained after initializing weights of network layers in the neural network model by using the training images in the training set as the input and using the expression types identified in the training images as an expected output. The processor 1001 is further configured to perform obtaining, in by using test images in a test set as an input of the initial neural network model, second expression types outputted by the initial neural network model, the test images in the test set being identified with expression types and having the same color encoding type as the first image. The processor 1001 is further configured to use, in response to a determination that a matching accuracy rate between the second expression types outputted by the initial neural network model and the expression types identified in the test images in the test set reaches (is greater than or equal to) a target threshold, the initial neural network model as a trained neural network model. The processor 1001 is further configured to use, in response to a determination that the matching accuracy rate between the second expression types outputted by the initial neural network model and the expression types identified in the test images in the test set is less than the target threshold, the training images in the training set as the input of the initial neural network model, and continuing to train the initial neural network model until the matching accuracy rate between the second expression types outputted by the initial neural network model and the expression types identified by the test images in the test set reaches (is greater than or equal to) the target threshold.

The embodiment of this application obtains a recognition request of a terminal, the recognition request being used for requesting recognition of an expression type of a face of an object in a first image. The embodiment further includes recognizing a first expression type from the first image using a neural network, the neural network being configured to extract a first feature from color information of pixels in the first image. The neural network is further configured to extract a second feature of facial key points from the first image, and use the first feature and the second feature to determine the first expression type of the face of the object in the first image. The embodiment further includes returning the recognized first expression type to the terminal in response to the recognition request. By fusing the image pixel feature and the facial key point feature, the accuracy of recognizing facial expression types can be improved, thereby achieving the technical effect of accurately recognizing facial expressions.

For a specific example in this embodiment, refer to the examples described in the foregoing embodiments. Details are not described in this embodiment.

A person of ordinary skill in the art may understand that the structure shown in FIG. 10 is merely an example, and the terminal may be a terminal device such as a smartphone (for example, an Android mobile phone, an iOS mobile phone, and the like), a tablet computer, a palmtop computer, a mobile internet device (MID), and a portable android device (PAD). FIG. 10 does not limit the structure of the electronic device. For example, the terminal may further include more or fewer components (such as a network interface and a display apparatus) than those shown in FIG. 10, or may have a configuration different from that shown in FIG. 10.

A person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disk, and the like.

An embodiment of this application further provides a non-transitory computer-readable storage medium. For example, the above-mentioned computer-readable storage medium may be used to perform the program code of the facial expression recognition method.

In this embodiment, the storage medium may be located in at least one of a plurality of network devices on a network shown in the foregoing embodiments.

For example, in this embodiment, the storage medium is configured to store program code used for performing the following steps: obtaining a recognition request of a terminal, the recognition request requesting recognition of an expression type of a face of an object in a first image, and extracting a first feature from color information of pixels in the first image. The stored program code may be further used for extracting a second feature of facial key points from the first image, fusing the first feature and the second feature, to obtain a fused feature, and determining a first expression type of the face of the object in the first image according to the fused feature. The stored program code may be further used for returning the recognized first expression type to the terminal in response to the recognition request.

For example, the storage medium is further configured to store program code used for executing the following steps: obtaining a training set, training images in the training set being identified with expression types and having the same color encoding type as the first image, and using the training images in the training set as an input of the neural network model, and training the neural network model to obtain an initial neural network model. The initial neural network model is obtained after initializing weights of network layers in the neural network model by using the training images in the training set as the input and using the expression types identified in the training images as an expected output. The stored program code may be further used for obtaining, by using test images in a test set as an input of the initial neural network model, second expression types outputted by the initial neural network model, the test images in the test set being identified with expression types and having the same color encoding type as the first image. The stored program code may be further used for using, in response to a determination that a matching accuracy rate between the second expression types outputted by the initial neural network model and the expression types identified in the test images in the test set reaches (is greater than or equal to) a target threshold, the initial neural network model as a trained neural network model. The stored program code may be further used for using, in response to a determination that the matching accuracy rate between the second expression types outputted by the initial neural network model and the expression types identified in the test images in the test set is less than the target threshold, the training images in the training set as the input of the initial neural network model, and continuing to train the initial neural network model until the matching accuracy rate between the second expression types outputted by the initial neural network model and the expression types identified in the test images in the test set reaches (is greater than or equal to) the target threshold.

For examples in this embodiment, refer to the examples described in the foregoing embodiments. Details are not described in this embodiment.

For example, in some embodiments, the foregoing computer-readable storage medium includes, but is not limited to: any medium that can store program code, such as a USB flash drive, a ROM, a RAM, a removable hard disk, a magnetic disk, or an optical disc.

The sequence numbers of the foregoing embodiments of this application are merely for description purposes, and are not intended to indicate the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application may be implemented in a form of a software product. The computer software product is stored in a storage medium and includes several instructions for instructing one or more computer devices (which may be a personal computer, a server, a network device, and the like) to perform all or some of the steps of the methods described in the embodiments of this application.

In the foregoing embodiments of this application, descriptions of the embodiments have respective focuses. As for parts that are not described in detail in one embodiment, reference may be made to the relevant descriptions of the other embodiments.

In the several embodiments provided in this application, it is to be understood that, the disclosed client may be implemented in another manner. The apparatus embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The above descriptions are merely implementations of this application. A person of ordinary skill in the art may make various improvements and refinements without departing from the spirit of this application. All such modifications and refinements shall fall within the protection scope of this application.

INDUSTRIAL APPLICABILITY

The embodiments of this application use an electronic device to extract a first feature from color information of pixels in a first image, extract a second feature of facial key points from the first image, and determine a first expression type of a face of an object in the first image according to a fused feature obtained by fusing the first feature and the second feature. In this way, the accuracy of recognizing facial expression types is improved, thereby achieving the purpose of accurately recognizing facial expressions.

What is claimed is:

1. A facial expression recognition method comprising:
   extracting a first feature of a facial texture from color information of pixels in a first image;
   extracting a second feature of facial key points from the first image;
   combining the first feature and the second feature, to obtain a fused feature; and
   determining, by processing circuitry of an electronic device, a first expression type of a face in the first image that corresponds to the fused feature, the first expression type being determined from a plurality of facial expression types according to a correlation between the facial texture of the first feature and the second feature of the facial key points indicated by the fused feature, each of the plurality of facial expression types being indicated by a different correlation between the facial texture of the first feature and the second feature of the facial key points.

2. The method according to claim 1, wherein
   the extracting the first feature comprises:
   extracting, through a convolutional neural network (CNN) of a trained neural network model, the first feature representing the facial texture in the first image from the color information of the pixels in the first image;
   the extracting the second feature comprises:
   extracting, through a graph neural network (GNN) of the trained neural network model, the second feature representing correlations between the facial key points, the facial key points representing components and/or a facial contour of the face;

the combining the first feature and the second feature comprises:
  performing, through a fusion layer of the trained neural network model, a feature fusion operation on the first feature and the second feature, to obtain the fused feature; and
the determining comprises:
  recognizing, through a classification network of the trained neural network model, from the plurality of facial expression types, the first expression type corresponding to the fused feature.

3. The method according to claim 2, wherein the extracting the first feature representing the facial texture in the first image comprises:
  using color encoding of the pixels in the first image as an input of the CNN, the CNN performing a convolution operation on the color encoding of the pixels in the first image, to obtain the first feature; and
  obtaining the first feature outputted by the CNN.

4. The method according to claim 3, wherein the using the color encoding of the pixels in the first image as an input of the CNN comprises:
  performing, in response to a determination that a position of a reference point in the first image is different from a position of a reference point in an image template, a cropping operation and/or a scaling operation on the first image to obtain a second image, such that a position of the reference point in the second image is the same as the position of the reference point in the image template; and
  using the color encoding of the pixels in the second image as the input of the CNN.

5. The method according to claim 2, wherein the extracting the second feature representing the correlations between the facial key points comprises:
  adding positions of the facial key points as nodes in the first image to obtain a face image, the face image comprising the nodes representing the facial key points, edges located between the nodes and representing correlation relations between the facial key points, and correlation weights of the edges; and
  performing feature extraction on the face image, to obtain the second feature.

6. The method according to claim 5, wherein, the obtaining the face image comprises:
  determining the facial key points, the correlation relations between the facial key points, and correlation weights between the facial key points according to a plurality of third images, the third images being images identified with expression types; and
  taking the facial key points as the nodes, connecting the edges located between the nodes and representing the correlation relations between the facial key points, and using the correlation weights between the facial key points as the correlation weights of the edges, to obtain the face image.

7. The method according to claim 1, wherein the combining the first feature and the second feature comprises:
  performing a weighted summation of the first feature and the second feature based on weights of the first feature and the second feature, and using a weighted summation result as the fused feature; or
  concatenating the first feature and the second feature, to obtain the fused feature.

8. The method according to claim 1, further comprising:
  obtaining a training set, training images in the training set being identified with expression types and having the same color encoding type as the first image;
  using the training images in the training set as an input of a neural network model, and training the neural network model to obtain an initial neural network model, the initial neural network model being obtained after initializing weights of network layers in the neural network model by using the training images in the training set as the input and using the expression types identified in the training images as an expected output;
  obtaining, by using test images in a test set as an input of the initial neural network model, second expression types outputted by the initial neural network model, the test images in the test set being identified with expression types and having the same color encoding type as the first image;
  using, in response to a determination that a matching accuracy rate between the second expression types outputted by the initial neural network model and the expression types identified in the test images in the test set is equal to or greater than a target threshold, the initial neural network model as a trained neural network model configured to perform the extracting of the first feature, the extracting of the second feature, the combining the first feature and the second feature, and the determining the first expression type; and
  using, in response to a determination that the matching accuracy rate between the second expression types outputted by the initial neural network model and the expression types identified in the test images in the test set is less than the target threshold, the training images in the training set as the input of the initial neural network model, and continuing to train the initial neural network model until the matching accuracy rate between the second expression types outputted by the initial neural network model and the expression types identified in the test images in the test set is equal to or greater than the target threshold.

9. The method according to claim 2, further comprising:
  returning the determined first expression type to a terminal;
  obtaining feedback information from the terminal, the feedback information indicating whether the determined first expression type is correct; and
  further training, in response to a determination that the feedback information indicates that the determined first expression type is incorrect, the trained neural network model using an image with the same facial expression type or the same background type as the first image.

10. A facial expression recognition apparatus, comprising:
processing circuitry configured to:
  extract a first feature of a facial texture from color information of pixels in a first image;
  extract a second feature of facial key points from the first image;
  combine the first feature and the second feature, to obtain a fused feature; and
  determine a first expression type of a face in the first image that corresponds to the fused feature, the first expression type being determined from a plurality of facial expression types according to a correlation between the facial texture of the first feature and the second feature of the facial key points indicated by the fused feature, each of the plurality of facial expression types being indicated by a different correlation between the facial texture of the first feature and the second feature of the facial key points.

11. The apparatus according to claim 10, wherein the processing circuitry comprises a trained neural network model is configured to:
   extract, through a convolutional neural network (CNN) of the trained neural network model, the first feature representing the facial texture in the first image from the color information of the pixels in the first image;
   extract, through a graph neural network (GNN) of the trained neural network model, the second feature representing correlations between the facial key points, the facial key points representing components and/or a facial contour of the face;
   perform, through a fusion layer of the trained neural network model, a feature fusion operation on the first feature and the second feature, to obtain the fused feature; and
   recognize, through a classification network of the trained neural network model, from the plurality of facial expression types, the first expression type corresponding to the fused feature.

12. The apparatus according to claim 11, wherein color encoding of the pixels in the first image is used as an input of the CNN, the CNN performing a convolution operation on the color encoding of the pixels in the first image, to obtain the first feature.

13. The apparatus according to claim 12, wherein the processing circuitry is configured to:
   perform, in response to a determination that a position of a reference point in the first image is different from a position of a reference point in an image template, a cropping operation and/or a scaling operation on the first image to obtain a second image, such that a position of the reference point in the second image is the same as the position of the reference point in the image template; and
   use the color encoding of the pixels in the second image as the input of the CNN.

14. The apparatus according to claim 11, wherein the trained neural network model is further configured to:
   add positions of the facial key points as nodes in the first image to obtain a face image, the face image comprising the nodes representing the facial key points, edges located between the nodes and representing correlation relations between the facial key points, and correlation weights of the edges; and
   perform feature extraction on the face image, to obtain the second feature.

15. The apparatus according to claim 14, wherein, the trained neural network model is configured to obtain the face image by:
   determining the facial key points, the correlation relations between the facial key points, and correlation weights between the facial key points according to a plurality of third images, the third images being images identified with expression types; and
   taking the facial key points as the nodes, connecting the edges located between the nodes and representing the correlation relations between the facial key points, and using the correlation weights between the facial key points as the correlation weights of the edges, to obtain the face image.

16. The apparatus according to claim 10, wherein the processing circuitry is configured to combine the first feature and the second feature by:
   performing a weighted summation of the first feature and the second feature based on weights of the first feature and the second feature, and using a weighted summation result as the fused feature; or
   concatenating the first feature and the second feature, to obtain the fused feature.

17. The apparatus according to claim 10, wherein the processing circuitry is further configured to:
   obtain a training set, training images in the training set being identified with expression types and having the same color encoding type as the first image;
   use the training images in the training set as an input of a neural network model, and train the neural network model to obtain an initial neural network model, the initial neural network model being obtained after initializing weights of network layers in the neural network model by using the training images in the training set as the input and using the expression types identified in the training images as an expected output;
   obtain, by using test images in a test set as an input of the initial neural network model, second expression types outputted by the initial neural network model, the test images in the test set being identified with expression types and having the same color encoding type as the first image;
   use, in response to a determination that a matching accuracy rate between the second expression types outputted by the initial neural network model and the expression types identified in the test images in the test set is equal to or greater than a target threshold, the initial neural network model as a trained neural network model configured to perform the extracting of the first feature, the extracting of the second feature, the combining the first feature and the second feature, and the determining the first expression type; and
   use, in response to a determination that the matching accuracy rate between the second expression types outputted by the initial neural network model and the expression types identified in the test images in the test set is less than the target threshold, the training images in the training set as the input of the initial neural network model, and continue to train the initial neural network model until the matching accuracy rate between the second expression types outputted by the initial neural network model and the expression types identified in the test images in the test set is equal to or greater than the target threshold.

18. The apparatus according to claim 11, wherein the processing circuitry is further configured to:
   return the determined first expression type to a terminal;
   obtain feedback information from the terminal, the feedback information indicating whether the determined first expression type is correct; and
   further train, in response to a determination that the feedback information indicates that the determined first expression type is incorrect, the trained neural network model using an image with the same facial expression type or the same background type as the first image.

19. A non-transitory computer-readable storage medium, storing computer-readable instructions thereon, which, when executed by a processor, cause the processor to perform a facial expression recognition method comprising:
   extracting a first feature of a facial texture from color information of pixels in a first image;
   extracting a second feature of facial key points from the first image;

combining the first feature and the second feature, to obtain a fused feature; and determining a first expression type of a face in the first image that corresponds to the fused feature, the first expression type being determined from a plurality of facial expression types according to a correlation between the facial texture of the first feature and the second feature of the facial key points indicated by the fused feature, each of the plurality of facial expression types being indicated by a different correlation between the facial texture of the first feature and the second feature of the facial key points.

20. The method according to claim 1, wherein the first feature is of a facial expression and the second feature is of at least one of a facial component or facial contour.

* * * * *